United States Patent
Feola et al.

(10) Patent No.: US 7,087,663 B2
(45) Date of Patent: Aug. 8, 2006

(54) ADDUCTS OF EPOXY RESINS AND PHOSPHORUS-DERIVED ACIDS AND A PROCESS FOR THEIR PREPARATION

(75) Inventors: Roland Feola, Graz (AT); Johann Gmoser, Graz (AT)

(73) Assignee: Surface Specialties Austria GmbH (AT)

( * ) Notice: Subject to any disclaimer, the term of this patent is extended or adjusted under 35 U.S.C. 154(b) by 355 days.

(21) Appl. No.: 10/683,894

(22) Filed: Oct. 10, 2003

(65) Prior Publication Data

US 2004/0077801 A1    Apr. 22, 2004

(30) Foreign Application Priority Data

Oct. 21, 2002    (AT)  .............................. A 1597/2002

(51) Int. Cl.
- *C08K 3/20* (2006.01)
- *C08L 63/00* (2006.01)
- *C08L 63/02* (2006.01)

(52) U.S. Cl. ....................... 523/403; 525/525
(58) Field of Classification Search .................. None
See application file for complete search history.

(56) References Cited

U.S. PATENT DOCUMENTS

| | | | |
|---|---|---|---|
| 4,018,848 A | 4/1977 | Khanna | |
| 4,256,844 A | 3/1981 | Martin et al. | 521/59 |
| 4,360,613 A | 11/1982 | Shimp | 523/416 |
| 4,452,929 A * | 6/1984 | Powers et al. | 523/403 |
| 4,720,403 A * | 1/1988 | Jasenof et al. | 427/327 |
| 4,801,628 A | 1/1989 | Ashing et al. | 523/412 |
| 4,853,455 A * | 8/1989 | Schneider et al. | 528/108 |
| 4,957,952 A * | 9/1990 | Sekmakas et al. | 523/402 |
| 4,992,525 A | 2/1991 | Kriessmann et al. | 528/103 |
| 5,141,815 A * | 8/1992 | Rickett | 428/418 |
| 6,201,074 B1 * | 3/2001 | Von Gentzkow et al. | 525/525 |

FOREIGN PATENT DOCUMENTS

| | | |
|---|---|---|
| EP | 0 288 943 A2 | 11/1988 |
| EP | 0 292 317 B1 | 11/1988 |
| JP | 07247342 A * | 9/1995 |

OTHER PUBLICATIONS

CAPLUS accession No. 1994:459751 for the Journal of Coatings Technology article by Massingill et al. entitled "Formability improvement of epoxy can and coil coatings. I. Blends of epoxy phosphate esters," vol. 65, No. 824, 1993.*

* cited by examiner

*Primary Examiner*—Robert Sellers
(74) *Attorney, Agent, or Firm*—Connolly Bove Lodge & Hutz LLP

(57) ABSTRACT

Adducts ABC of epoxy resins A and reaction products BC of epoxy resins B with phosphorus-derived acids C, and mixtures of such adducts, containing a mass fraction of not more than 5% of unreacted acid C, the reaction products BC containing at least one acidic phosphoric ester group or phosphonic ester group per molecule, process for preparing them, and their use for preparing physically drying and also one-component and two-component coating materials.

10 Claims, No Drawings

ADDUCTS OF EPOXY RESINS AND PHOSPHORUS-DERIVED ACIDS AND A PROCESS FOR THEIR PREPARATION

FIELD OF THE INVENTION

The invention relates to adducts of epoxy resins and phosphorus-derived acids and to a process for their preparation.

BACKGROUND OF THE INVENTION

Epoxy resins are known for their good corrosion protection properties, and therefore are frequently used as primers for metals. Similarly, the corrosion-inhibiting effect of phosphoric acid has been known for a long time. The combination of both classes of substance in one resin system is also not novel.

In the existing processes for preparing epoxy resin-phosphoric acid adducts a problem arises through the uncontrolled reaction of both components, resulting either in high molar mass reaction products or in unreacted phosphoric acid. Thus, for example, it is not possible to react an epoxy resin having a defined epoxide group content with phosphoric acid in an amount-of-substance ratio of 1 mol of phosphoric acid per 1 mol of epoxide groups deliberately in such a way, without leaving a considerable fraction of the phosphoric acid unreacted.

If the ratio of the amount of substance of phosphoric acid to the amount of substance of epoxide groups is reduced to below 1:1, there is less free phosphoric acid left at the end, but the uncontrolled increase in the degree of polymerization of the adduct becomes higher, a situation which can easily lead to gelling of the batch and can lead to products completely impossible to use.

The reason why the synthesis of the adduct is so difficult to control is that it depends heavily on the solvent used, on the nature of the epoxy resin, on the reaction temperature, on the addition time, and probably on certain other factors such as the reactor geometry.

Nor is the objective achieved by raising the amount-of-substance ratio of phosphoric acid to epoxide groups to more than 1:1. Although the increase to high molar masses in the formation of the adduct is stopped, the amount of free phosphoric acid which remains is larger. Residues of free phosphoric acid in the system are undesirable, since they impede the neutralization of the reaction product with amine (to obtain dilutability in water) and hence lead indirectly to poorer solubility of the product in water. Residues of free phosphoric acid are also a disruption in the cured coating film, particularly as a result of surface defects and floating.

SUMMARY OF THE INVENTION

The object is therefore to provide adducts of epoxy resins and phosphorus-derived acids which possess a defined, adjustable degree of polymerization and in whose preparation the mass fraction of unreacted acid in the product mixture is less than 5%.

Surprisingly, it has been found that the stated object can be achieved by conducting the reaction in a plurality of stages. In a first stage an epoxy resin having a defined specific epoxide group content is synthesized. In a separate reaction an ester is prepared by reacting a low molar mass liquid epoxy resin (e.g., a diepoxy resin based on bisphenol A with a molar mass of approximately 380 g/mol) with a phosphorus-derived acid, a reaction in which an amount-of-substance ratio of acid to epoxide groups of below 0.3:1 proves particularly favorable.

In the third stage the two precursors are mixed and then reacted at elevated temperature to give a resin which is virtually free of epoxide groups (with a specific epoxide group content below 100 mmol/kg). Subsequently the resin is neutralized, by adding amines, for example, and adjusted, by addition of water, to a mass fraction of solids which makes it easy to handle. A further possibility is to admix to the resin, either before or possibly also after neutralization, a curing component which crosslinks by reaction with hydroxyl groups (melamine resins, phenolic resins, blocked isocyanates). In this way, heat-curable (stoving) systems are obtained.

Without the addition of curing agents the adducts of the invention are only physically drying. In some fields of application, given an appropriately high molar mass of the adduct, this may well be sufficient. Moreover, the modified resin may be admixed if needed with additives, emulsifying agents, etc.

The invention accordingly provides uniform adducts ABC of epoxy resins A and reaction products BC of epoxy resins B with phosphorus-derived acids C, and mixtures of such adducts, comprising a mass fraction of not more than 5% of unreacted acid, the reaction products BC containing at least one acidic phosphoric ester group or phosphonic ester group per molecule. The adducts ABC preferably have an acid number of from about 10 to about 70 mg/g. They are substantially free from epoxide groups, i.e., their specific epoxide group content is generally not more than 100 mmol/kg, preferably not more than 50 mmol/kg, and in particular not more than 20 mmol/kg. The mass fraction of phosphorus in the adducts is preferably between 0.8 and 4%, more preferably from 1.0 to 3.5%, and in particular from 1.3 to 3.3%. The adducts preferably have a Staudinger index of from 8.0 to 20.0 cm$^3$/g, more preferably from 9.0 to 18.0 cm$^3$/g, and in particular from 10 to 17 cm$^3$/g.

DETAILED DESCRIPTION OF THE PREFERRED EMBODIMENTS

The acid number is defined in accordance with DIN 53 402 as the ratio of the mass $M_{KOH}$ of potassium hydroxide required to neutralize a sample under analysis to the mass $m_B$ of said sample (mass of the solids in the sample in the case of solutions or dispersions); its customary unit is "mg/g".

The formerly so-called "intrinsic viscosity number", called "Staudinger index" $J_g$ in accordance with DIN 1342, part 2.4, is the limiting value of the Staudinger function $J_V$ at decreasing concentration and shear stress, $J_V$ being the relative change in viscosity related to the mass concentration $\beta_B = m_B/V$ of the dissolved substance B (with the mass $m_B$ of the substance in the volume V of the solution), i.e., $J_V=(\eta_r-1)/\beta_B$. Here, $\eta_r-1$ denotes the relative change in viscosity, i.e., $\eta_r-1=(\eta-\eta_s)/\eta_s$. The relative viscosity $\eta_r$ is the ratio of the viscosity $\eta$ of the solution under analysis to the viscosity $\eta_s$ of the pure solvent. (The physical meaning of the Staudinger index is that of a specific hydrodynamic volume of the solvated polymer coil at infinite dilution and in the state of rest.) The unit commonly used for J is "cm$^3$/g"; formerly often "dl/g". The Staudinger index is here determined in dimethylformamide as solvent.

The epoxy resins A and B are selected independently of one another from diepoxide or polyepoxide compounds which are obtainable conventionally by reacting epichlorohydrin with aromatic or (cyclo)aliphatic compounds having two or more hydroxyl groups per molecule (Taffy process) or can be obtained by reacting diepoxides or polyepoxides with said aromatic or (cyclo)aliphatic compounds having two or more hydroxyl groups per molecule (advancement reaction) Preference is given to epoxy resins based on aromatic dihydroxy compounds, such as bisphenol A, bisphenol F, dihydroxydiphenyl sulfone, hydroquinone, resorcinol, 1,4-bis[2-(4-hydroxyphenyl)-2-propyl]benzene, or aliphatic dihydroxy compounds such as hexane-1,6-diol, butane-1,4diol, cyclohexanedimethanol, or oligo-propylene and polypropylene glycol having mean degrees of polymerization of between 3 and 40. The specific epoxide group content of the epoxy resins, independently of one another for the epoxy resins A and B, is in each case preferably from 0.4 to 7 mol/kg, in particular from 0.6 to 6 mol/kg. In one preferred embodiment diepoxide compounds are used both for A and B.

Particular preference is given to epoxy resins based on bisphenol A and bisphenol F and also mixtures thereof.

As acid component C it is possible to use inorganic acidic phosphorus compounds C1 or organic phosphonic acids C2, each having at least two acidic hydrogen atoms, which are attached directly or via an oxygen atom to a phosphorus atom. The inorganic phosphorus-derived acids C1 are selected from orthophosphoric acid $H_3PO_4$, diphosphoric acid $H_4P_2O_7$, triphosphoric acid $H_5P_3O_{10}$, and the higher homologs (oligomers), phosphorous acid $H_3PO_3$, diphosphorous acid $H_4P_2O_5$, and higher homologs thereof, and also hypophosphorous acid $H_3PO_2$ and its higher homologs. Particularly suitable are orthophosphoric acid, mixtures of dimers and higher oligomers of orthophosphoric acid, phosphorous acid, and higher oligomers thereof. The organic phosphonic acids C2 are, in particular, alkanephosphonic acids $R^1$—$PO_3H_2$, aromatic phosphonic acids $R^2$—$PO_3H_2$, and the corresponding phosphonous acids $R^1$—$PO_2H_2$ and $R^2$—$PO_2H_2$, $R^1$ being a linear, branched or cyclic alkyl radical having 1 to 20 carbon atoms and $R^2$ being a substituted or unsubstituted aromatic radical having 6 to 20 carbon atoms. Methanephosphonic acid and benzenephosphonic acid are particularly suitable.

The invention further provides a process for preparing uniform adducts ABC containing units derived from epoxides and from phosphorus-derived acids.

In a first stage of this process an adduct is prepared from epoxide compounds B and inorganic phosphorus-derived acids C1 or phosphonic acids C2, each of the starting materials being used in amounts such that the amount-of-substance ratio between acidic hydrogen atoms of the acid C and epoxide groups of the epoxide compounds B is from 0.3 to 0.9 mol/mol. The acid number of these adducts BC is preferably from 5 to 200 mg/g, more preferably from 8 to 180 mg/g, and in particular form 10 to 160 mg/g. Their Staudinger index $J_0$ is preferably from 2 to 18 cm$^3$/g; more preferably from 3 to 16 cm$^3$/g, and in particular from 4 to 14 cm$^3$/g. The reaction is preferably conducted in a protic solvent or solvent mixture, the epoxide compound B and the acid C each being dissolved individually in an organic solvent. The preferred reaction temperature lies between room temperature (20° C.) and 90° C. Reaction is continued until the acid number remains constant. The specific epoxide group content of the reaction mixture, based on the mass of the solids, is at that point virtually zero. The solvent is then largely stripped off by distillation under reduced pressure.

Subsequently, in the second stage, the adducts BC are reacted with epoxide compounds A, the reaction temperature being preferably from 100° C. to 180° C. This reaction is conducted until the specific epoxide group content, based on the mass of the solid resin, is less than 100 mmol/kg.

For the preparation of one-component coating materials the curing agent (amino resin or blocked isocyanate) is then added and, after thorough homogenization at from 80 to 110° C., depending on the activation temperature of the curing agent, the acid groups which remain in the resin are converted at least partly (preferably to an extent of from 20 to 80%) to the salt form by addition of a neutralizing agent, preferably an amine. The neutralized resin mixture can then be dispersed in water.

For the preparation of two-component coating materials the resin is neutralized alone and dispersed in water. This dispersion can then be mixed immediately prior to processing with nonblocked polyfunctional isocyanates, which may either have been conventionally hydrophilicized or may be present in an unmodified form (in which case aliphatic isocyanates are preferred). The dispersion of the adduct ABC may also act as an emulsifier for the unmodified, nonblocked isocyanate. For the preparation of two-component coating materials it is also possible, similarly, to use amino resins suitable for the purpose, such as water-dilutable melamine resins, for example.

The adducts ABC of the invention can also be used as binders for physically-drying coating materials.

Coating materials formulated with these binders are particularly suitable for the coating of sheets of base metals. They bring about good protection against corrosion, in particular where the coated metals are in contact with salt-containing aqueous media.

The invention is illustrated by the examples below without being thereby restricted in its scope. In the examples below, as in the text above, all figures with the unit "%" denote mass fractions (ratio of the mass of the substance in question to the mass of the mixture), unless stated otherwise. Concentration figures in "%" are mass fractions of the dissolved substance in the solution (mass of the dissolved substance divided by the mass of the solution). The stated values for the Staudinger index $J_0$ were measured in dimethylformamide as solvent. The mass fraction of solids is given as the ratio of the final weighed mass to the starting mass in % (cg/g).

The following abbreviations are additionally used:

| | |
|---|---|
| SEG | Specific epoxide group content $n_{EP}/m_B$ (amount of substance of the epoxide groups $n_{EP}$ in a sample B, relative to its mass $m_B$ or to the mass of the solid resin in the sample; corresponds to the reciprocal of the "epoxide equivalent weight" EEW) |
| EP 1 | Diepoxy resin based on bisphenol A (SEG = 5.26 mol/kg; "epoxide equivalent weight" EEW approximately 190 g/mol) |
| EP 2 | Diepoxy resin based on polypropylene glycol (SEG = 3.13 mol/kg; EEW approximately 320 g/mol) |
| EP 3 | Diepoxy resin, flexibilized by an aliphatic component (® Cardolite NC-514, from Cardanol, SEG = 2.86 mol/kg; EEW approximately 350 g/mol) |
| EP 1001 | ® Epikote 1001 (Deutsche Shell Chemie GmbH, type 1 epoxy resin based on bisphenol A (SEG = 2.06 mol/kg)) |
| EP 1004 | ® Epikote 1004 (type 4 epoxy resin based on bisphenol A (SEG = 1.07 mol/kg)) |
| EP 1007 | ® Epikote 1007 (type 7 epoxy resin based on bisphenol A (SEG = 0.62 mol/kg)) |

-continued

| | |
|---|---|
| HDGE | Hexanediol diglycidyl ether, SEG = 8.68 mol/kg |
| DER 736 | Diepoxy resin based on polypropylene glycol (from Dow Chemical) SEG = 5.26 mol/kg, EEW is approximately 190 g/mol |
| MEK | Methyl ethyl ketone |
| IP | Isopropanol |
| MP | Methoxypropanol |
| DMEA | Dimethylethanolamine |
| CE | ® Cardura E 10, from Shell Chemicals BV |
| MEKO | Methyl ethyl ketoxime |
| DBTL | Dibutyltin dilaurate |
| ® Desmodur N 3390 | Trimerized, aliphatic isocyanate based on 1,6-hexamethylene diisocyanate, 90% strength solution in butyl acetate, from Bayer AG |

EXAMPLES

Epoxy Resin Component E1

A mixture of 380 g of EP 1 ($n_{EP}$=2.0 mol), 194 g of bisphenol A (0.85 mol) and 108 g of EP 3 ($n_{EP}$ =0.31 mol) was heated to 120° C. with stirring. 1.2 g of triphenylphosphine were added as catalyst, triggering an exothermic reaction. The reaction mixture was held further at 140° C. until the specific epoxide group content of the mixture was 1.0 to 1.05 mol/kg (EEW of 950 to 1000 g/mol). The Staudinger index $J_0$ of the resin was 10.2 cm³/g. The composition was subsequently cooled to 115° C. and diluted to a mass fraction of solids of 80% by addition of MP. The mass fraction of solids was determined by drying a sample at 125° C. for one hour in a forced-air oven.

Epoxy Resin Component E2

The procedure described above was used to react 380 g of EP 1 ($n_{EP}$=2.0 mol) and 96 g of EP 2 ($n_{EP}$=0.30 mol) with 194 g of bisphenol A and 1.2 g of triphenylphosphine as catalyst until a specific epoxide group content of 1.0 to 1.05 mol/kg had been reached (EEW of 950 to 1000 g/mol) and the reaction product was diluted with MP to a mass fraction of solids of approximately 80%. The Staudinger index $J_o$ of the resin was 9.9 cm³/g.

In accordance with the details in table 1 further epoxy resin components E3 to E7 were prepared by the procedure described for E1, some of the epoxy resins employed being acquired commercially (®Epikote 1001, 1004, 1007, from Deutsche Shell Chemie GmbH). The epoxy resin components E4 and E5 were prepared by reacting, as above, an amount of the epoxy resin mentioned first in table 1 containing 2 mol of epoxide groups and an amount of the epoxy resin mentioned second containing 0.3 mol of epoxide groups, 0.85 mol of bisphenol A and 1.2 g of triphenylphosphine as catalyst. The meaning of the abbreviations for the epoxy resins is explained in the compilation of the abbreviations.

TABLE 1

Epoxy resin components

| Example | Epoxy resin | SEG in mol/kg | EEW in g/mol | Staudinger index $J_0$ in cm³/g |
|---|---|---|---|---|
| E3 | ® Epikote 1001 (type 1) | 2.11 | 475 | 5.1 |
| E4 | EP1/EP2 | 0.93 | 1080 | 11.2 |

TABLE 1-continued

Epoxy resin components

| Example | Epoxy resin | SEG in mol/kg | EEW in g/mol | Staudinger index $J_0$ in cm³/g |
|---|---|---|---|---|
| E5 | EP1/EP3 | 0.57 | 1770 | 12.8 |
| E6 | ® Epikote 1004 (type 4) | 1.05 | 950 | 9 |
| E7 | ® Epikote 1007 (type 7) | 0.57 | 1750 | 13.7 |

Phosphoric Acid Component P1

In accordance with the invention the reaction product of phosphoric acid and epoxy resin was prepared in three steps: in the first stage, 102 g of IP and 190 g ($n_{Ep}$=1.0 mol) of the resin EP1 were premixed in a suitable container. Then, in stage 2, a mixture of 26 g (0.2 mol) of phosphoric acid (75% strength solution in water) and 30 g of isopropanol was heated to 50° C.

Then, with stirring, the mixture from stage 1 was run over the course of an hour into the product of stage 2, the temperature being held at 50° C. (exothermic reaction, during which occasional cooling was needed). After the end of the addition the reaction mixture was held at 50° C. for about two to three hours until a specific epoxide group content of below 0.1 mol/kg had been reached (EEW of above 10 000 g/mol). Finally, a further 11 g of isopropanol were added and, the reaction mixture was held at 80° C. until the acid number remained virtually constant. The results of analysis on the product obtained were as follows:

| | |
|---|---|
| Mass fraction of solids: | approximately 66% |
| Staudinger index $J_0$: | 5.9 cm³/g |
| Acid number: | 97 mg/g |

Phosphoric Acid Component P2

Synthesis took place as above, using in stage 1 48 g of IP, 152 g ($n_{EP}$=0.8 mol) of EP1 and 50 g ($n_{EP}$=0.2 mol) of CE. In stage 2 a mixture of 39 g (0.3 mol) of phosphoric acid (75% strength solution in water) with 25 g of IP was heated to 50° C. The products of the two stages 1 and 2 were reacted as in the example for P1. The following characteristic values were found:

| | |
|---|---|
| Mass fraction of solids (nonvolatile fraction): | approximately 80% |
| Staudinger index $J_0$: | 5.4 cm³/g |
| Acid number: | 156 mg/g. |

In accordance with the details in table 2 further reaction products (adducts BC) of phosphoric acid $H_3PO_4$ ("PS") and epoxy resins (containing in each case 1 mol of EP groups) were prepared:

TABLE 2

Reaction products of epoxy resins and phosphoric acid

| Ex. | Amount-of-substance ratio PS to epoxide groups in mol/mol | Acid number in mg/g | Epoxy resin | P content of solid resin in % | Staudinger index $J_0$ in ml/g | Solvent |
|---|---|---|---|---|---|---|
| P3 | 0.1:1 | 38 | EP1 | 4 | 4.7 | IP |
| P4 | 0.1:1 | 20 | EP1 | 4.1 | 7.8 | IP/MEK 1:1 |
| P5 | 0.1:1 | not measured | EP1 | not measured | gelled | MEK |
| P6 | 0.1:1 | 11 | EP1001 | 1.8 | 14.1 | IP |
| P7 | 0.15:1 | 21 | EP1001 | 2.5 | 10.7 | IP |
| P8 | 0.3:1 | 58 | EP1001 | 5.2 | 8 | IP |
| P9 | 0.3:1 | 140 | EP1 | 12.7 | 7.2 | IP/MEK 1:1 |
| P10 | 0.15:1 | 92 | HDGE | 10.6 | 4.6 | IP |
| P11 | 0.3:1 | 145 | DER736 | 12.7 | 4 | IP/MEK 1:1 |

Blocked, Water-Insoluble Isocyanate (Curative H)

105 g of MEKO (1.2 mol) and 0.1 g of DBTL were heated to 80° C. under inert gas and 230 g (0.4 mol) of ®Desmodur N 3390 were added in portions. The reaction was exothermic and was continued until all of the isocyanate groups had reacted. The clear solution had a mass fraction of solids of 93%; it was diluted further to 80% using butylglycol.

Adduct A1

852 g of the epoxy resin E1 and 435 g of the phosphoric acid component P1 were heated at 105° C. with stirring in a suitable reaction vessel. By distillation under reduced pressure the solvent mixture was removed to leave a mass fraction of solids of 80%, giving a composition which was of high viscosity. This composition was held at 105° C. for one hour more. Measurement performed on this sample gave a Staudinger index $J_0$ of 13.2 cm³/g and a free epoxide group content of virtually zero. The acid number found was 25 mg/g. 181 g of the curing agent H were added and the mixture was homogenized at 100° C. for 1 h. Subsequently, at 100° C., 35 g of DMEA and 750 g of water were added, the solution obtained was homogenized at 70° C. for a further hour, and then, with the temperature falling, water was added in portions for dilution to a mass fraction of solids of 39%.

In a manner similar to that described under A1, further adducts ABC (A2 to A5) were prepared; the amounts of starting materials and the results are compiled in table 3.

TABLE 3

Adducts

| Ex. | Epoxy resin component Epoxy resin mass \| type \| $n_{EP}$ | Bisphenol A mass \| amount of substance | SEG in mol/kg (EEW in g/mol) | $J_0$ in cm³/g | Mass of solid resin | Phosphoric acid component (solid resin) |
|---|---|---|---|---|---|---|
| A 2 | E 1 380 g \| EP1 \| 2.0 mol<br>108 g \| EP3 \| 0.31 mol | 194 g \| 0.85 mol | 1.01 (990) | 10.2 | 682 g | 287 g P 1 |
| A 3 | E 2 380 g \| EP1 \| 2.0 mol<br>96 g \| EP2 \| 0.30 mol | 194 g \| 0.85 mol | 1 (998) | 9.9 | 670 g | 240 g P 1 |
| A 4 | E 3 760 g \| EP1 \| 4.0 mol | 228 g \| 1.0 mol | 2.11 (475) | 5.1 | 988 g | 290 g P 2 |
| A 5 | E 4 437 g \| EP1 \| 2.3 mol<br>128 g \| EP2 \| 0.40 mol | 228 g \| 1.0 mol | 0.93 (1080) | 11.2 | 793 g | 178 g P 1 |
| A 6 | E 5 320 g \| EP1 \| 1.7 mol<br>90 g \| EP3 \| 0.26 mol | 194 g \| 0.85 mol | 0.57 (1770) | 12.8 | 604 g | 90 g P 2 |

| Ex. | Staudinger-Index $J_0$ in cm³/g | P-content of solid resin in % | Acid number in mg/g | Curative addition solid resin g | DMEA-addition in g | Mass fraction of solids in % | Sum of the mass solid in resin in g |
|---|---|---|---|---|---|---|---|
| A 2 | 13.2 | 2.7 | 30 | 145 | 35 | 39 | 1114 |
| A 3 | 12.8 | 2.4 | 29 | 182 | 30 | 36.5 | 1092 |
| A 4 | 10.8 | 2.8 | 38 | 192 | 53 | 33.1 | 1278 |
| A 5 | 14.5 | 1.7 | 18 | 0 | 22 | 34.1 | 971 |
| A 6 | 15.7 | 1.6 | 21 | 0 | 16 | 37.6 | 694 |

For coatings testing, the above-described adducts A1 to A6 were each adjusted with water to an application viscosity of from 800 to 1000 mPa·s, to give the clearcoat materials L1 to L5. The clearcoat materials obtained in this way were drawn down onto cold-rolled metal sheet using a film-drawing cube so as to give a dry film thickness of 20 μm.

The results of coatings testing are summarized in table 4. The coating films give consistently outstanding corrosion protection properties.

TABLE 4

Results of coatings testing

|  | Coating material | | | | | |
|---|---|---|---|---|---|---|
|  | L1 | L2 | L3 | L4 | L5 | L6 |
| Dry film thickness in μm | 18 | 20 | 21 | 19 | 22 | 21 |
| Curing conditions | 30 min, 160° C. | 30 min, 160° C. | 30 min, 160° C. | 48 h, RT | 48 h, RT | 48 h, RT |
| Cross-cut (1) | GT 0 | GT 0 | GT 1 | GT 1 | GT 0 | GT 1 |
| Rusting (2) after 336 h | 0 | 1 | 0 | 1 | 1 | 1 |
| Subfilm corrosion (3) in mm after 336 h | 2 | 2.5 | 2 | 4.5 | 5.5 | 3.5 |

Key to table 4:
(1) Cross-cut in accordance with DIN 53151
(2) Determination of the degree of rusting after salt spray test; DIN 53167; Score: 0: no rust spots; 1: isolated rust spots; 2: about 20% of the surface is covered with rust spots; 3: about 40% of the surface is covered with rust spots; 4: more than 50% of the surface is covered with rust spots; 5: the entire surface is rusty
(3) Subfilm corrosion in accordance with DIN 53167

What is claimed is:

1. An aqueous dispersion which is at least partially neutralized, of adducts ABC of epoxy resins A and reaction products BC of epoxy resins B with phosphorus-derived acids C, wherein the adducts comprise a mass fraction of not more than 5% of unreacted acid C, and wherein the reaction products BC contain at least one acidic phosphoric ester group or phosphonic ester group per molecule.

2. The aqueous dispersion of claim 1 wherein the adducts ABC have an acid number is from approximately 10 to approximately 70 mg/g.

3. The aqueous dispersion of claim 1 wherein the specific epoxide group content of the adducts ABC is not more than 100 mmol/kg.

4. The aqueous dispersion of claim 1 wherein the mass fraction of phosphorus in the adducts ABC is between 0.8 and 4%.

5. The aqueous dispersion of claim 1 wherein the Staudinger index of the adducts ABC is from 8.0 to 20.0 cm$^3$/g.

6. The aqueous dispersion of claim 1 wherein the epoxy resins A are selected from the qroup consistinq of epoxy resins derived from bisphenol A and epoxy resins derived from bisphenol F.

7. The aqueous dispersion of claim 1 wherein the adducts ABC comprise units derived from orthophosphoric acid.

8. A process for preparing the aqueous dispersion of claim 1 which comprises in a first step preparing a reaction product of an epoxide compound B with a phosphorus-derived acid C selected from inorganic acidic phosphorus compounds C1 and organic phosphonic acids C2, the compounds B and C being used in amounts such that the amount-of-substance ratio of acidic hydrogen atoms in C to epoxide groups in B is 0.3 to 0.9:1, and in a second step reacting the reaction product BC with an epoxide compound A to give an adduct ABC, the reaction being continued until the specific epoxide group content, based on the solids of the reaction mixture, is less than 100 mmol/kg, in a third step, at least partially neutralizinq the adduct ABC, and in a final step, dispersing the at least partially neutralized adduct in water.

9. A method of preparing a coating on sheets of base metals, comprising applying the aqueous dispersion of claim 1 to a sheet of base metal, and drying the coated sheet.

10. The aqueous dispersion of claim 1 wherein the epoxy resins B are selected from the group consisting of epoxy resins derived from bisphenol A and epoxy resins derived from bisphenol F.

* * * * *

UNITED STATES PATENT AND TRADEMARK OFFICE
CERTIFICATE OF CORRECTION

PATENT NO. : 7,087,663 B2  
APPLICATION NO. : 10/683894  
DATED : August 8, 2006  
INVENTOR(S) : Roland Feola et al.

It is certified that error appears in the above-identified patent and that said Letters Patent is hereby corrected as shown below:

Column 10, line 33, "neutralizinq the adduct ABC, and in a final step, dispersing"

should read -- neutralizing the adduct ABC, and in a final step, dispersing --

Signed and Sealed this

Thirtieth Day of January, 2007

JON W. DUDAS  
*Director of the United States Patent and Trademark Office*